United States Patent
Choudhary et al.

(10) Patent No.: US 8,477,775 B2
(45) Date of Patent: Jul. 2, 2013

(54) UNIFYING LOCAL AND MOBILITY NETWORK IDENTIFIERS

(75) Inventors: Seemant Choudhary, Fremont, CA (US); Kumara Das Karunakaran, San Jose, CA (US); Shashi H. Ankaiah, Kallahalli Mandya (IN); Balachander Rajakondala, Ghatkesar Hyderabad (IN)

(73) Assignee: Avaya Inc., Basking Ridge, NJ (US)

( * ) Notice: Subject to any disclaimer, the term of this patent is extended or adjusted under 35 U.S.C. 154(b) by 379 days.

(21) Appl. No.: 12/776,897

(22) Filed: May 10, 2010

(65) Prior Publication Data

US 2010/0290398 A1    Nov. 18, 2010

Related U.S. Application Data

(60) Provisional application No. 61/178,296, filed on May 14, 2009.

(51) Int. Cl.
*H04W 40/00* (2009.01)
*H04L 12/56* (2006.01)

(52) U.S. Cl.
USPC .......................................... 370/389; 370/328

(58) Field of Classification Search
USPC ................. 370/310, 328, 329, 331, 338, 351, 370/389
See application file for complete search history.

(56) References Cited

U.S. PATENT DOCUMENTS

| | | | |
|---|---|---|---|
| 7,505,434 B1 * | 3/2009 | Backes | 370/331 |
| 7,701,912 B2 * | 4/2010 | Thompson et al. | 370/338 |
| 7,804,806 B2 * | 9/2010 | Borkar et al. | 370/338 |
| 7,826,869 B2 * | 11/2010 | Nagarajan et al. | 455/560 |
| 7,885,233 B2 * | 2/2011 | Nagarajan et al. | 370/331 |
| 7,958,256 B2 * | 6/2011 | Keeler | 709/233 |
| 2002/0022483 A1 * | 2/2002 | Thompson et al. | 455/439 |
| 2005/0174943 A1 * | 8/2005 | Wang | 370/235 |
| 2006/0056446 A1 * | 3/2006 | Lee et al. | 370/465 |
| 2007/0081477 A1 | 4/2007 | Jakkahalli et al. | |
| 2009/0310535 A1 * | 12/2009 | Anumala et al. | 370/328 |
| 2011/0004913 A1 * | 1/2011 | Nagarajan et al. | 726/1 |

FOREIGN PATENT DOCUMENTS

WO    WO2008005794 A2    1/2008

OTHER PUBLICATIONS

European Search Report dated 3 Sep. 2010 from Ep Publication No. 2252096A1 for corresponding European Patent Application No. 10005017.8.

* cited by examiner

*Primary Examiner* — Chi Pham
*Assistant Examiner* — Robert Lopata
(74) *Attorney, Agent, or Firm* — Anderson Gorecki & Rouille LLP

(57) ABSTRACT

In a mobility domain providing wired and wireless network transport to an enterprise or campus environment, a mobility switch maps a logical network identifier, such as a VLAN ID, to a "home" or wired network VLAN ID so that a mobile device is mapped to the wired VLAN for user identification, IP address consistency, and network policy enforcement. Propagation of the mapping to mobility switches ensures that a roaming user is mapped to the wired network VLAN from a remote L2 switch, and mobility tunnels across L3 boundaries allow roaming into a different broadcast domain or L3 switch connectivity in the mobility domain. Users are assigned to mobility VLAN(s) which are mapped to a VLAN in the wired domain at a mobility switch. The wireless users can roam within the wireless enterprise, or mobility domain, and the network maintains access to the user assigned mobility VLAN(s).

14 Claims, 7 Drawing Sheets

UNIFYING LOCAL AND MOBILITY NETWORK IDENTIFIERS

CROSS REFERENCE TO RELATED APPLICATIONS

This Patent Application claims the benefit under 35 U.S.C. §119(e) of U.S. Provisional Patent Application No. 61/178,296 filed on May 14, 2009, entitled, "Method for Unifying Local and Mobility VLAN(s) in a Large Scale Enterprise Network" the contents and teachings of which are hereby incorporated by reference in their entirety.

BACKGROUND

Personal wireless devices continue to gain increased popularity as mobile devices become smaller and more affordable. Wireless network support, in the form of WiFi access points and more recently, WiMax coverage, continue to drive the demand for wireless bandwidth and corresponding applications. Wireless network support has also infiltrated corporate enterprise networks, as decreasing hardware costs enable the feasibility of wireless coverage in a campus or building environment for a multitude of employees. Therefore, wireless network coverage, just as cellphones emerged initially as a luxury or justified expense for mission critical personnel, is commonly available to a typical consumer or employee. As the relative usage of wireless network access continues to rise in proportion to traditional wired connections offered by stationary devices, the network infrastructure adapts by integrating wireless, or so-called mobility transport, with conventional wired access and switching. Accordingly, unified switches, which combine wired and mobility access and throughput resources in the same network appliance, mitigate the distinction between wired and wireless routers and obviate the need for separate deployment of wireless routers and bridges at specifically chosen network locations deemed worthy of mobility access.

SUMMARY

In a mobility domain providing wired and wireless network transport to an enterprise or campus environment, unified mobility switches integrate wired and wireless access and switching for users who can employ both stationary and mobile devices for accessing network services from various locations in the mobility domain. Users typically employ a stationary device such as a desktop PC from an office or cubicle, and then may seek access from an alternate location such as a conference room or common area via a laptop, PDA, or other personal communication device, and also tend to roam from location to location using the mobile device.

Virtual networks are often employed in the mobility domain to facilitate communication with mobile devices. Virtual networks allow grouping of network devices as a common LAN (local area network) independently of the physical location and connections between them. A virtual network such as a VLAN (Virtual Local Area Network) is commonly used in wired enterprise networks to separate broadcast domains. A single broadcast domain typically is mapped to a single IP subnet at Layer 3, thus all devices in the single broadcast domain belong to same IP subnet. VLANs are also employed to apply access control, QOS implementations, and other policies for the users assigned to the VLAN. Since VLAN based policies can be applied at layer 2 (L2) switches, such policies can be applied at line rate to a group of users. Thus, VLANS or other virtual networks are useful for grouping a class of users in the mobility domain. However, the scope of the typical VLAN is bounded by layer 3 (L3) routers. Roaming users spanning an L3 boundary typically become separated from the VLAN. Configurations herein are based, in part, on the observation that VLAN usage in mobility networks results in a disconnect between devices using wired access and devices using wireless access, particularly when the wireless user roams beyond an L3 boundary.

Unfortunately, conventional methods of supporting roaming network users suffers from the shortcoming that it is difficult to identify a mobile device of a user across various access points that may be employed for wireless network access throughout the mobility domain. Often, a different VLAN is employed for mobility (i.e. wireless) and roaming access than for wired access from a stationary device. Since network policies and IP addresses are tied to a particular wired device corresponding to a user, identification of a mobile device establishing a wireless connection cannot be associated with the user. It would be beneficial to identify a particular user regardless of whether access is made from a stationary or mobile device, and further to maintain connectivity to the user as the user roams among coverage areas corresponding to different access points and mobility switches. Consistent application of network policies and network (IP) addresses is facilitated by consistently identifying a user across various access mediums.

Accordingly, configurations herein substantially overcome the shortcomings of applying identical policies for both wired and wireless users by mapping a logical network identifier, such as a VLAN ID, to a "home" or wired network VLAN ID so that a mobile device is mapped to the wired VLAN based on user identification and by virtue of this mapping maintain the IP address consistency, and network policy enforcement consistency no matter where the user roams in the mobility domain. Propagation of the mapping to peer mobility switches ensures that a roaming user is mapped to the wired network VLAN from a remote mobility switch, and mobility tunnels across L3 boundaries allow roaming into a different broadcast domain or L3 switch connectivity in the mobility domain.

In particular, in a wireless enterprise defined by the mobility domain, the users are assigned to mobility VLAN(s) which are mapped to a VLAN in the wired domain at a mobility switch. In effect, the mapping assigns a wired VLAN to the wireless user at a mobility switch. The wireless users can roam within the wireless enterprise, or mobility domain, and the network maintains access to the user assigned mobility VLAN(s).

In further detail, the method of unifying wired and mobility networks performs a mapping of virtual network identifiers for transporting mobility traffic includes receiving a packet frame from a mobile device, in which the packet frame has a mobility network identifier such as a mobility VLAN. The mobility VLAN is mapped, in a mobility VLAN table at a mobility switch configured for switching both wired message traffic and mobility message traffic, to a wired VLAN network identifier, such that the mobility message traffic is defined by a tunnel to the wireless access point that provides the wireless link to the mobile device and the wired message traffic employs a dedicated wired connection on the mobility switch. The mobility switch determines, from the mapping, the wired VLAN network identifier corresponding to the user of the mobile device, and forwards the packet frame based on the determined wired VLAN network identifier, such that the forwarded packet frame is transported as if it emanated via mapped wired network identifier. Since the wired network identifier is associated with user parameters such as IP address and network policies, the mobility traffic is handled similarly to message traffic from any wired device of the user in the wired VLAN.

Alternate configurations of the invention include a multi-programming or multiprocessing computerized device such as a workstation, handheld or laptop computer or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a computer-readable storage medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM, RAM or PROM chips, field programmable gate arrays (FPGAs) or as an Application Specific Integrated Circuit (ASIC). The software or firmware or other such configurations can be installed onto the computerized device (e.g., during operating system execution or during environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Disclosed below is an example configuration of a mobility domain having mobility users employing mobile devices via a mobility VLAN. A mobility VLAN table maps the mobility VLAN to a wired VLAN corresponding to a stationary device of the user, such as a desktop PC in an office. Roaming usage by the user, for example employing a laptop from a remote location such as a lab or conference room, allows the mobility switch to employ the mobility VLAN to identify the wired VLAN for identifying the user.

Conventional arrangements for coordinating wired and wireless access by the same user include assigning wired users to mobility VLAN(s). One proposed solution for wireless mobility includes locating all wireless VLAN(s) in the core of the network. By tunneling all wireless traffic to the core of the network the system ensures that the wireless users get access to their assigned VLAN from anywhere in the network. In this case no mapping is required and wireless VLAN exists in the core network as wired VLAN.

One drawback of such a conventional solution is that wireless access and wired access networks are segregated. A user can access the enterprise network using wireless connection or from a wired port. In either case, it is desirable to impose same access policies and assign same IP address. While access policies can be replicated between wired access and wireless access, the approach would not provide for identifying and assigning the same IP address.

When using virtual network identifiers including VLAN IDs as per IEEE 802.1q, 16 bits are provided for the VLAN field, while the VLAN ID is a 12 bit quantity (0-4095). It is possible to use more than 12-bits for mobility VLAN tagging on tunnels to uniquely identify the mobility VLAN(s) on mobility switches in the domain. However, this non-standard technique may not be available on commercial available switching chipsets and requires a more complicated control plane to manage the uniqueness of the mobility VLAN tag in the mobility domain.

The disclosed approach, in contrast, maps the mobility VLAN to a local VLAN tag when the traffic ingresses a mobility switch from an access point or a peer mobility switch over a tunnel. It also maps the local VLAN tag back into a mobility domain unique mobility-VLAN tag when the traffic egresses to a peer mobility switch or an access switch. By performing mapping in both ingress and egress, better isolation of the mobility VLAN and local VLAN tag space is achieved.

Figure 1:
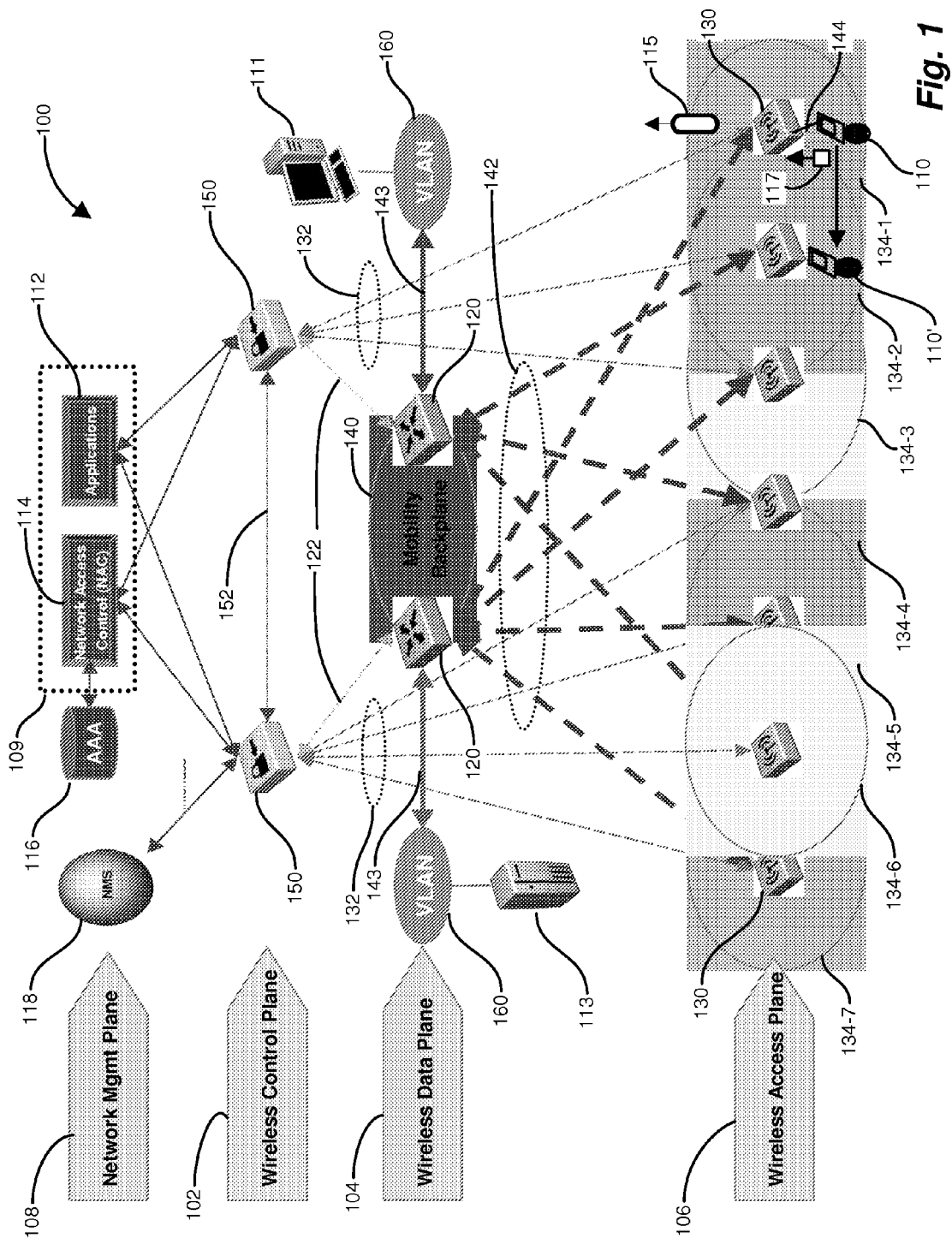
FIG. 1 is a context diagram of a mobility domain suitable for use with the present configuration.

FIG. 1 is a context diagram of a mobility domain suitable for use with the present configuration. Referring to FIG. 1, the mobility domain 100 is an enterprise wide network that typically encompasses a particular site of a corporation or institution, and is analogous to an area traditionally served by a conventional LAN (local area network). In the mobility domain 100, a wireless control plane 102 performs user access and authentication through a wireless controller 150. The wireless control plane 102 therefore admits users to the mobility domain 100, in conjunction with the access control server 114 and access and authentication database 116, and also transports control information in the form of configuration, routing table, security and radio access information, shown by arrows 122, 132 and 152 respectively. Once admitted to the mobility domain (i.e. logging on at a stationary device 111, activating a wireless user device 110, etc.), a typical user invokes the data plane 104 for performing message traffic transport. The data plane 104 performs transport and switching of data to and from the user device 110, 111 using the control information supplied by the control plane 102 to mobility switches 120 and access points 130 using communication links 132 and 122 through a fabric of network connections 142. The wireless access plane 106 bridges the wireless gap from the wireless access point 130 to the user device 110 using a wireless connection 144, and includes modulation and transmission of the data via an RF channel medium, typically according to IEEE 802.11, discussed further below. The wireless access plane 106 generally provides an overlapping arrangement of coverage areas 134-1 . . . 134-7 (134 generally) to support seamless roaming. A network management plane 108 provides centralized storage and coordination of items global to the mobility domain, such as applications 112, network access control 114, and the access and authentication (AAA) database DB, 116. A network management system (NMS) 118 also provides operator oversight and diagnostic information such as SNMP based inquires.

In configurations disclosed herein, a virtual network groups devices for communication independently of the physical connections between them. Such a virtual network is identified by a virtual network identifier, discussed further below. The virtual network identifier denotes collection of devices corresponding to a logical LAN configured such that communication is enabled as if they were part of the same wire (LAN). In the disclosed arrangement, a VLAN 160 (virtual LAN) has the same attributes as a physical LAN, but it allows for network nodes (e.g. switches, mobile devices, stationary endpoints) to be grouped together even if they are not physically located on the same network switch. Network reconfiguration can therefore be performed through software instead of physically relocating devices. In the particular configuration disclosed, the virtual network identifier is a VLAN identifier as defined by IEEE 802.1Q.

In the mobility domain 100, the virtual LANs (VLANs) 160 provide virtual bridging across a plurality of physical and/or wireless connections 142 and 144 to permit roaming from coverage area 134 to coverage area 134-N, as shown by the mobile device 110 in coverage area 134-1 moving to coverage area 134-2 as mobile device 110'. The mobility domain 100 therefore provides mobility connectivity for mobile devices 110 through wireless switches 120 and access points 130, and also performs wired switching in a mobility backplane 140 and for fixed devices 111, discussed further below. Stationary, or wired devices 111 are also connected to the core network 140 through wired connections 143, and include user devices 111 such as PCs and server 113, both of which may also be part of a VLAN 160.

Figure 2:
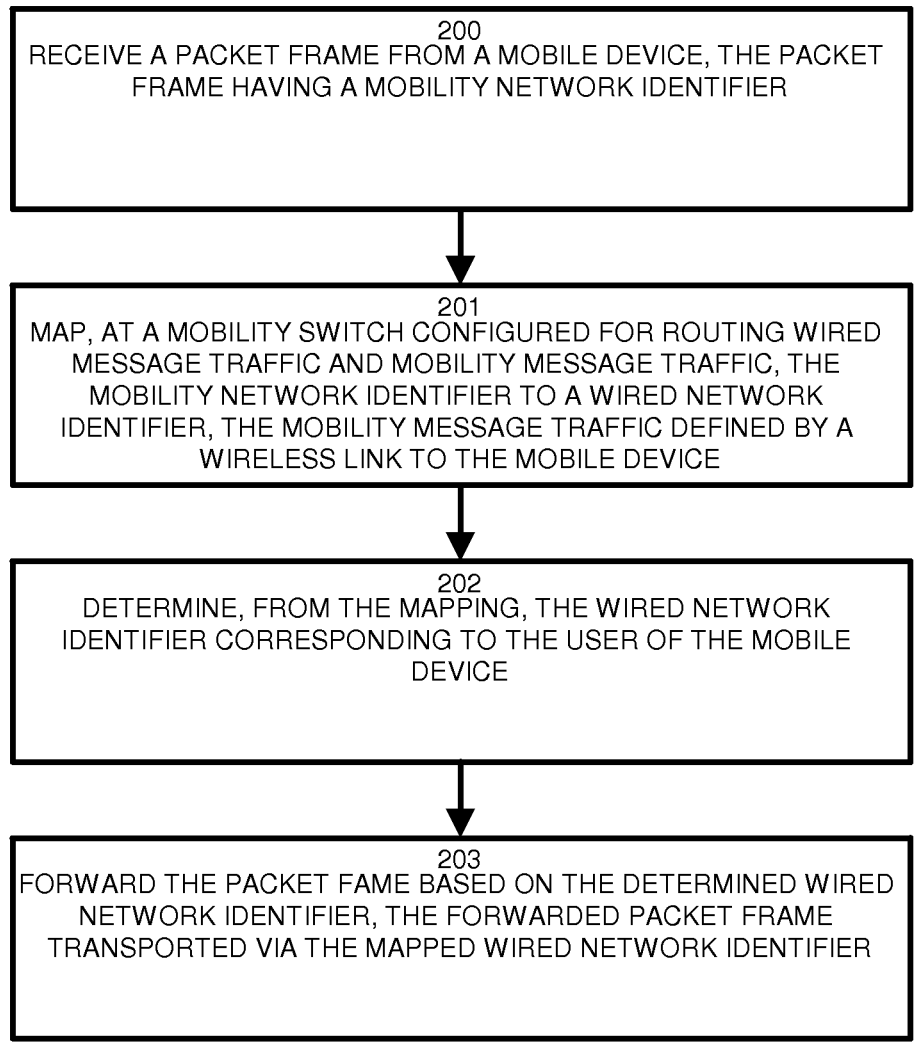
FIG. 2 is a flowchart of VLAN mapping for unifying local and mobility virtual networks in the mobility domain of FIG. 1

FIG. 2 is a flowchart of VLAN mapping for unifying local and mobility virtual networks in the mobility domain of FIG. 1. Referring to FIGS. 1 and 2, the method of transporting mobility traffic as disclosed herein includes, at step 200, receiving a packet frame 115 from a mobile device 110, and inserting the mobility network identifier 182 into the received frame 115, typically at the access point 130, based on mobility network identifier determined at the time of mobility user authentication. A mobility switch 120, configured for switching both wired message traffic and mobility message traffic, maps the mobility network identifier in the packet frame 115 to a wired network identifier, such that the mobility message traffic is defined by a wireless link to the mobile device, as disclosed at step 201 (mobility traffic generally via wired links, employing a wireless link only for the last "leg" from the access point 130 to the mobile device 110). The virtual network identifier (VLAN ID) is applicable to both wired and mobility devices, although typically a wired "fixed" device corresponding to a user is associated with a different VLAN than a mobile device attributed to the same user, hence the need for associating the VLANs arises. The access point 130 employs a MAC (Media Access Control) address 117 associated with the mobile device 110 to identify the VLAN of the mobile device 110. Since the mobile device 110 may not bear any other identification of the user other than the VLAN ID, the mobility switch 120 determines, from the mapping, the wired network VLAN identifier 184 corresponding to the user of the mobile device 110, as shown at step 202.

The mobile device's 110 MAC address 117 is available in the frame 115 as received from the wireless device 110. The mobility switch 120 may determine the corresponding mobility VLAN identifier 182 from frame 115 based on the source MAC address 117 in the frame 115. In case of full VLAN ID conversion, the AP 130 inserts the mobility VLAN identifier 182 before it sends the traffic to the mobility switch 120 over the access tunnel 174 (FIG. 4 below), which derives the mobility VLAN identifier 182 in the frame 115 on ingress to the mobility switch 120. Alternatively, in partial VLAN ID conversion, the AP 130 does not insert the identifier tag 182 and the mobility switch 120 derives this from the MAC address 117 of the client mobile device 110 based on a MAC based VLAN assignment. After the mobility device traffic is mapped to a wired network VLAN identifier 184, policies applicable to traffic on the wired network identifier 184 can be applied to the traffic coming from the mobile devices 110 for the corresponding VLAN 182, thus from the same user 170. Thus, the packet frame 115 from the mobile device 110 may receive similar treatment as if it emanated from the wired network device 111 (e.g. desktop PC) of the user. The mobility switch 120 forwards the packet frame 115 based on the determined wired network identifier 184 and the destination device address, such that the forwarded packet frame 115 is transported via the mapped wired VLAN 184 to a wired device 111 such as desktop or PC or to another mobile device 110 that belongs to the senders mobility VLAN 182. When forwarding traffic to a mobile device 110 the wired network identifier 184 is converted back into the corresponding mobility network identifier 182 as determined from the VLAN mapping table 180, as depicted at step 203.

Figure 3:
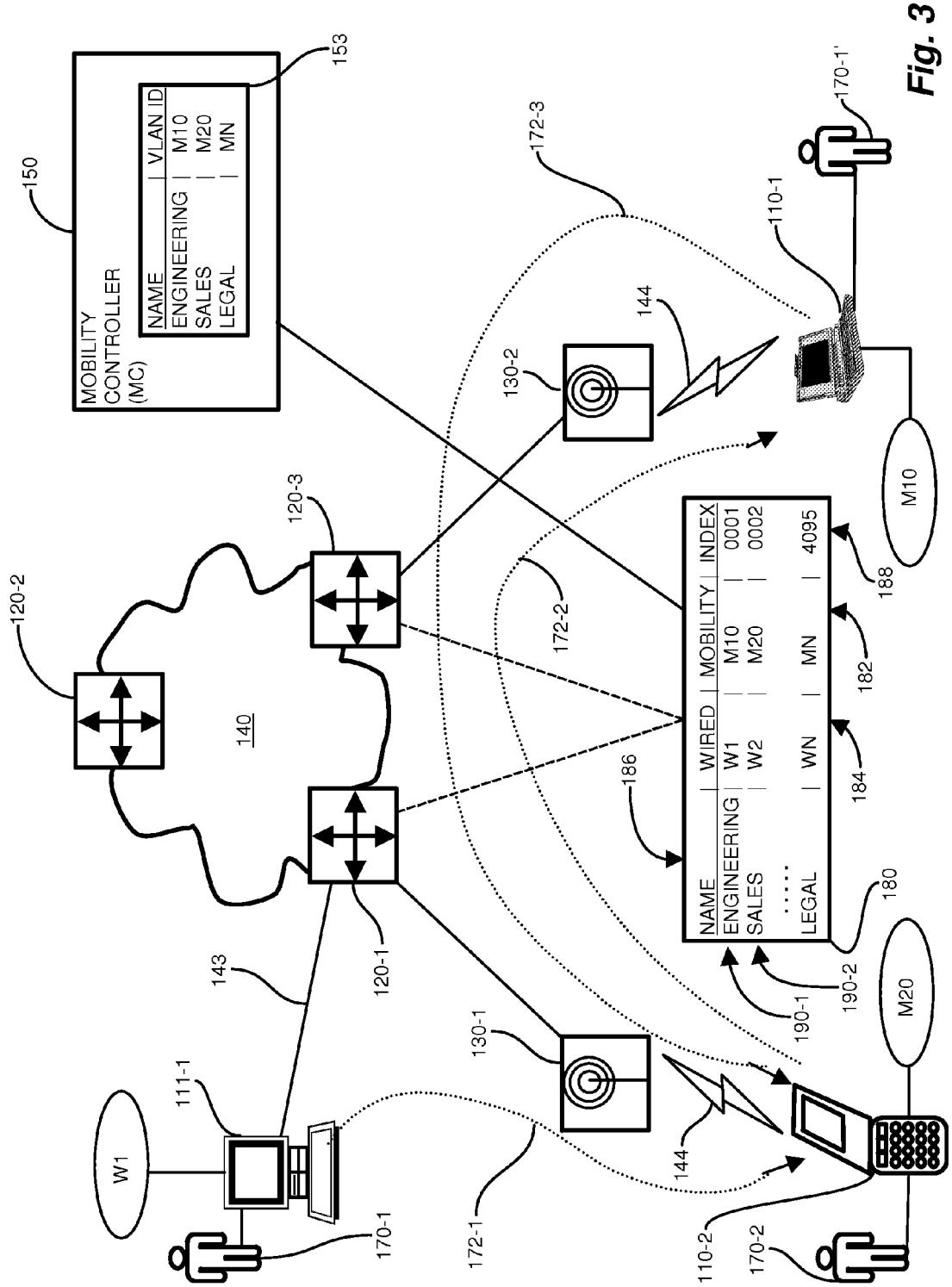
FIG. 3 is a block diagram of VLAN mapping as in FIG. 2

FIG. 3 is a block diagram of VLAN mapping as in FIG. 2. Referring to FIGS. 1 and 3, FIG. 3 depicts a mobility scenario of a user 170-1, an employee of the engineering department, who typically employs a PC 111-1 via a wired connection 143-1. The PC 111-1 connects to mobility switch 120-1, which provides a core (i.e. wired) network 140 along with mobility switches 120-2 and 120-3. User 170-1 also employs a laptop as a mobile device 110-1 (as user 170-1'). The PC 111-1 is recognized as a wired device belonging to VLAN W1. To support the mobility and roaming scenarios a VLAN mapping table 180 maps mobility VLAN(s) to wired VLAN(s), thus unifying the mobility network and wired network by providing a similar network identity to a user 170 accessing the network 140 via either the wired VLAN identifier 184 or the mobility VLAN identifier 182. The VLAN mapping table 180 includes fields for the mobility VLAN 182, the corresponding wired (i.e. stationary device or non-mobility) VLAN 184, a name 186 of the VLAN, and an index 188 for each VLAN entry, discussed further below.

The VLAN mapping table 180 is a configuration item or download that is arranged according to preassigned VLANs and network identities (i.e. IP addresses of fixed devices 111). An administrator configures the supported mobility VLAN(s) in the mobility domain at the mobility controller 150 using unique names typically identified by group or organization. The mobility controller 150 generates a mobility VLAN name to a mobility VLAN ID mapping 153 and propagates this mapping table to all mobility switches in the mobility domain directly managed by the mobility controller 150 and to peer mobility controllers 150-N which then forward it to the mobility switches 120-N managed by them. Thus all mobility switches 120 in the mobility domain receive the table of supported mobility VLAN(s) and the mobility VLAN ID 153 assigned to the names 186.

The administrator also configures the mapping between the mobility VLAN name 186 and a wired VLAN ID 184 on one or more mobility switches 120 in the mobility domain that have direct physical access to the desired wired VLAN 184 for a particular corresponding mobility VLAN 182, as reflected in the mobility VLAN table 180, mirroring the named VLAN mapping 153 in the mobility controller 150. The mapping between mobility VLAN 182 and wired VLAN 184 unifies the wireless devices 110 on the mobility VLAN with the wired devices 111 on the wired VLAN into a single broadcast domain, and thus enables a mobility user to access the domain 100 from a mobility device 110 as if they were connecting via their wired (fixed) device 111, such as an office PC, and receive similar network identity via a common policy and IP address.

In the example shown, user 170-1 sends a message to user 170-2, at mobile device 110-2, from the wired device 111-1 as shown by arrow 172-1. Some time later, user 170-1 access via a mobile device 110-1 (as user 170-1') and receives a reply message 172-2 to mobile device 110-1 corresponding to stationary device 111-1. A subsequent reply 172-3 from user 170-1' is transported to VLAN M20, corresponding to VLAN W2, from entry 190-2, which denotes user 170-2 for purposes of IP address identification and network policy administration. The wired device of VLAN W2 for user 170-1 may also be local to the core network 140, or it may be roaming from another L2 network, discussed in FIG. 4 below.

The unification of the wired VLAN(s) with the mobility VLAN(s) is provided by the VLAN mapping table 180, and by propagating the table to switches 120 in the mobility domain 100, maintains access to a mobile user's mobility VLAN 182 from all locations (typically defined by access points 130) in the mobility domain 100, thus ensuring that the mobile user 170 maintains access to the mapped wired VLAN 184 via a mobile device 110. Typically, in a wired network a wired VLAN maps to an IP subnet, as is known in the art. A particular feature of the mobility VLAN mapping 180 is that a mobile device 110 can maintain the IP address assigned to it since its IP subnet does not change as it roams in the mobility domain 100. A second feature is that the access rights and policies that are applied on the wired VLAN 184 are also applied to the traffic from the wireless users. For example, the switches 120 in the wired VLAN may implement an access policy that allows access to only certain servers in the wired VLAN. If a user logs in as a wired user using PC 111-1 then the switches can limit this access accordingly. When the same user logs in as a wireless user using a laptop from another location in the enterprise, the mapping 180 allows enforcement of the same access policy on the user 170 as the from the wired device 111. The policy is therefore tied to the user and not on the access location. This can be achieved if users are assigned to mobility VLAN(s) based on their login credentials and the mobility VLAN is mapped to a single wired VLAN in the mobility domain. In this case, the mobility traffic is switched at the mobility switches 120 that enforce a common access policy for wired as well as wireless users.

While VLAN IDs are typically recognized only among an L2 domain, L3 boundaries may be traversed by the VLAN mapping disclosed herein. L3 mobility can be provided using the mobile IP feature at layer 3, as described in RFC 3344 and RFC 3775. The Mobile IP solution has the burden of using more than one IP address per device (Care-of address and home address), therefore the send and receive paths of bi-directional flow from a mobile device can be different and the implementation may be driven by the version of IP being used.

Figure 4:
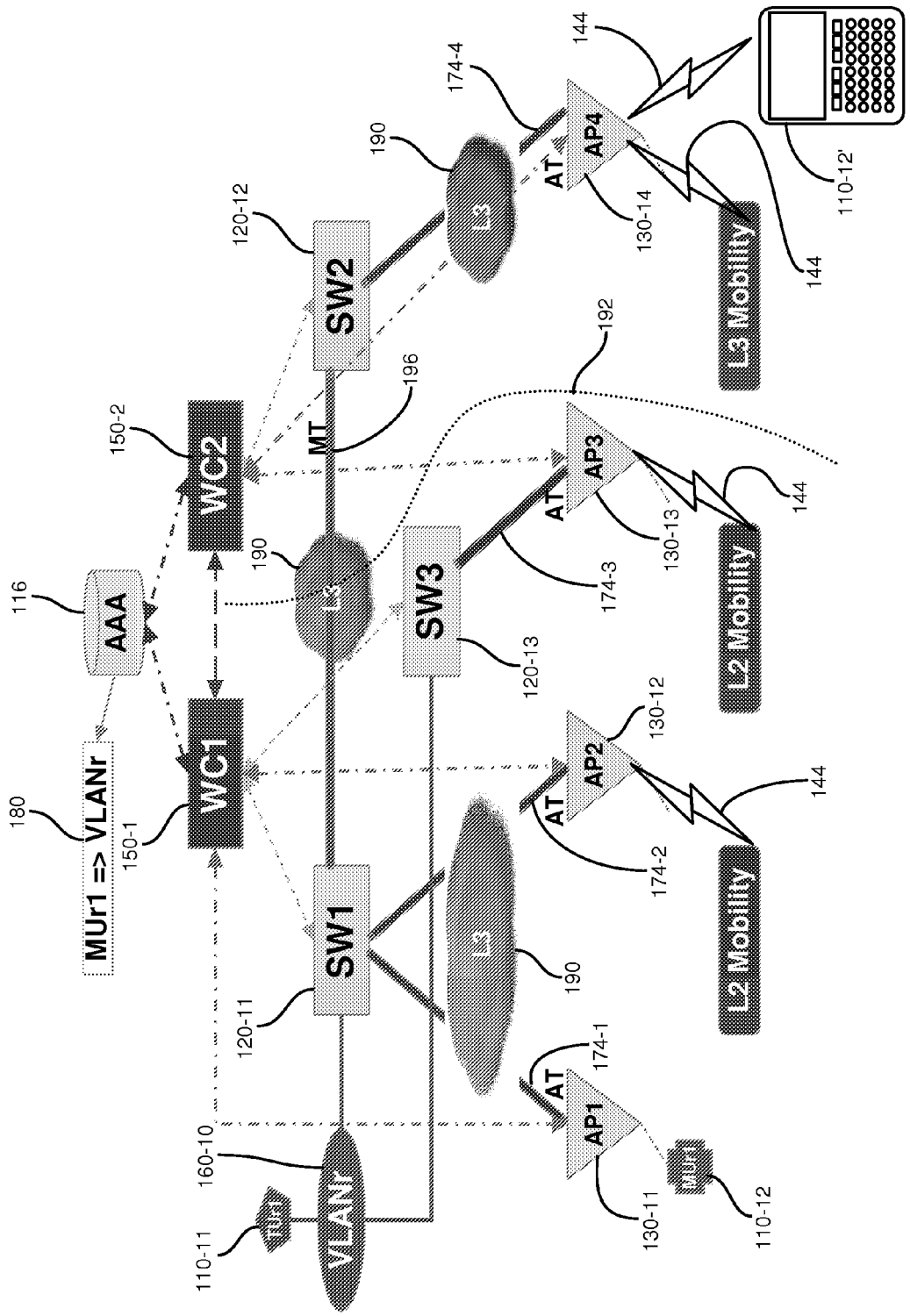
FIG. 4 is a diagram of VLAN roaming for a mobile device in the mobility domain of FIG. 1.

FIG. 4 is a diagram of VLAN roaming for a mobile device 110 in the mobility domain of FIG. 1. Referring to FIG. 4, mobility switches 120-11 and 120-13 (SW1 and SW3) are servers for VLANr (160-10). It should be noted that virtual LANs are primarily layer 2 constructs, compared with IP subnets which are layer 3 constructs, thus giving rise to mapping across L3 boundaries via tunnels. Mobility switch 120-12 (SW2) connects via an L3 connection 190, thus defining L3 boundary 192. Mobile user 110-12 corresponds to wired user 110-11, as shown by the mapping of MUr1 to VLANr 160-10 in the VLAN mapping table 180. Access points 130-11.130-13 connect to mobility switches SW1 and SW2 via access tunnels 174-1.174-3. The access tunnels 174-1.174-3 (174 generally) provide a transport for wireless frames from the access point 130 to the switching infrastructure of the core network 140. The access tunnels 174 therefore allow VLAN recognition through the L3 connection 190, thus effectively bridging L2 networks. Similarly, a mobility tunnel 196 effectively bridges the L3 boundary 192 by extending a VLAN 160 from one network (SW1, SW3) to another (SW2) to provide remote access to the remote VLAN for roaming. User 110-12 is afforded L2 mobility by access points 130-11 . . . 130-13 because of direct access to SW1 or SW2 via L2 connectivity, as the VLAN visibility extends throughout the L2 network. The mobility tunnel 196 therefore extends VLANr to SW3, thereby providing L3 roaming capability if user 110-12 roams to a coverage area 134 of access point AP4 (via mobility tunnel 196 and access tunnel 174-4), shown as user 110-12'.

The access points 130 employ a mapping of MAC address to VLAN, IP address, or other suitable indexing to correlate the wireless link 144 to the corresponding tunnel 174 or connection 142. The mobile devices 110 typically have a preassigned MAC address, and are allocated to a default or "home" VLAN by a predetermined assignment stored at the mobility controller and employed for defining the VLAN mapping table 180, as described above. From a VLAN perspective, the VLAN mapping ends at the access point where mapping an 802.11 wireless packet completes the transport.

In general, the MAC address of the user's mobile device 110 will control the mapping back to the "home" (i.e. wired) VLAN. Thus, a consistent MAC address would be needed in order to "transfer" a session from device to device, as opposed to roaming (as in with a laptop) or remote login (setting up a session). For example, such a device transition might be performed if the user uses a device that can be connected using a wired access or wireless access and it uses same MAC address on both interfaces. One scenario this may work is if a laptop is initially connected using wired access and it is undocked and it immediately connects using wireless access and it uses the same MAC address for communication on wireless access as it used on wired access. In this scenario, since the user gets access to the same VLAN and uses the same MAC address, he may be able to continue the communication with small glitch. This is an additional benefit of the invention provided the client device supports the capability of using same MAC address on wired/wireless interface.

Figure 5:
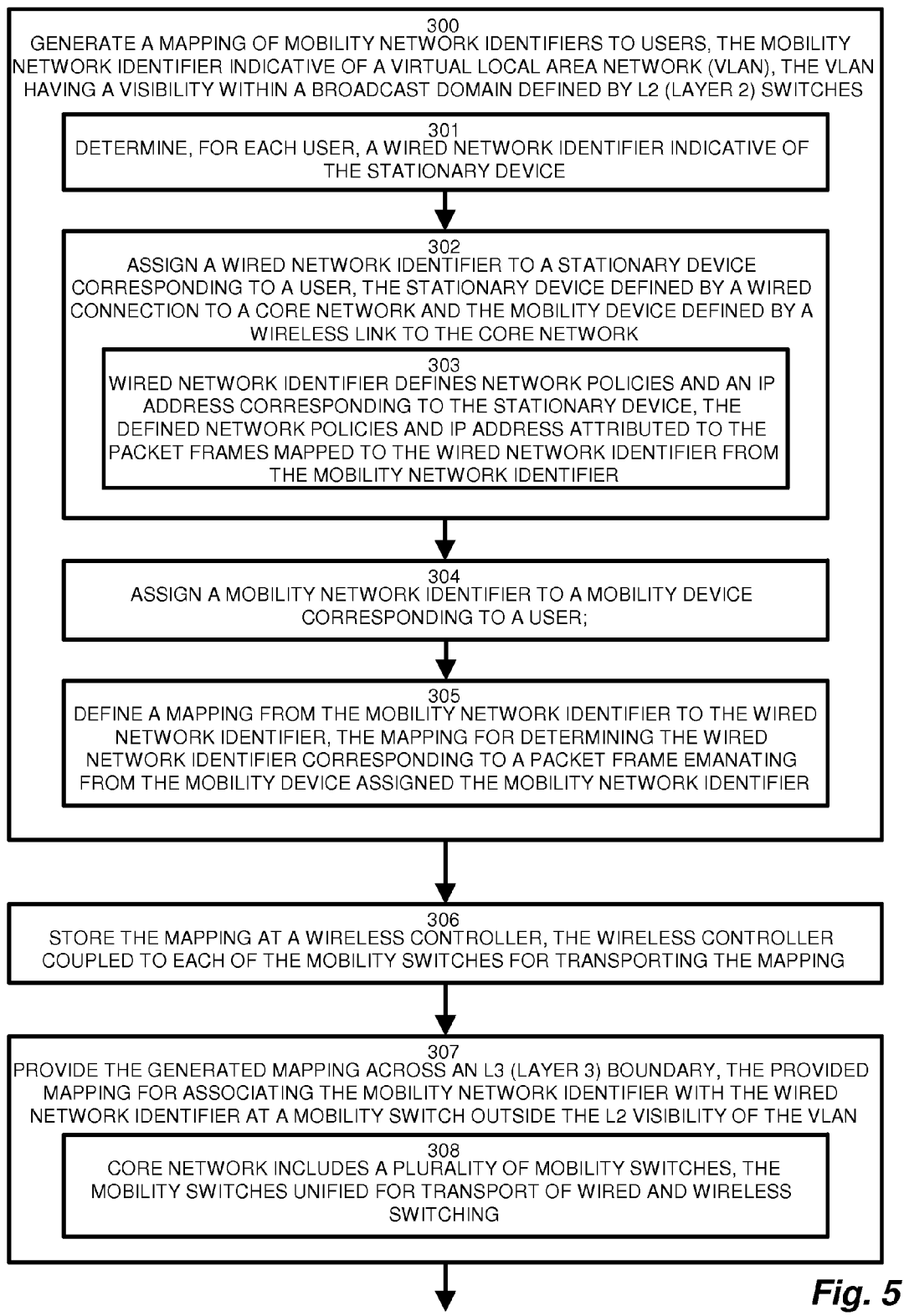
FIGS. 5-7 are a flowchart of VLAN mapping in the configuration of FIG. 4.
Figure 6:
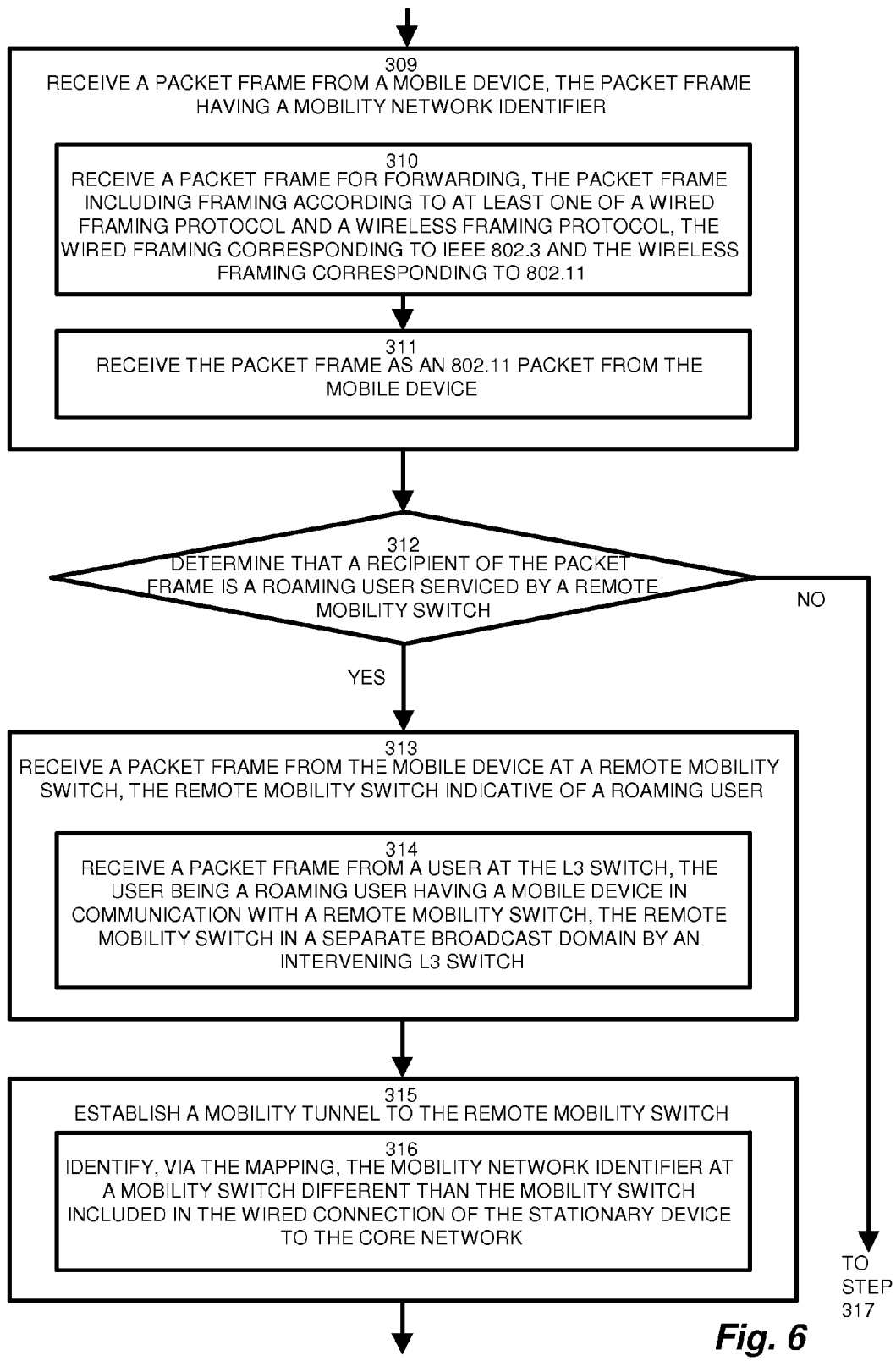
Figure 7:
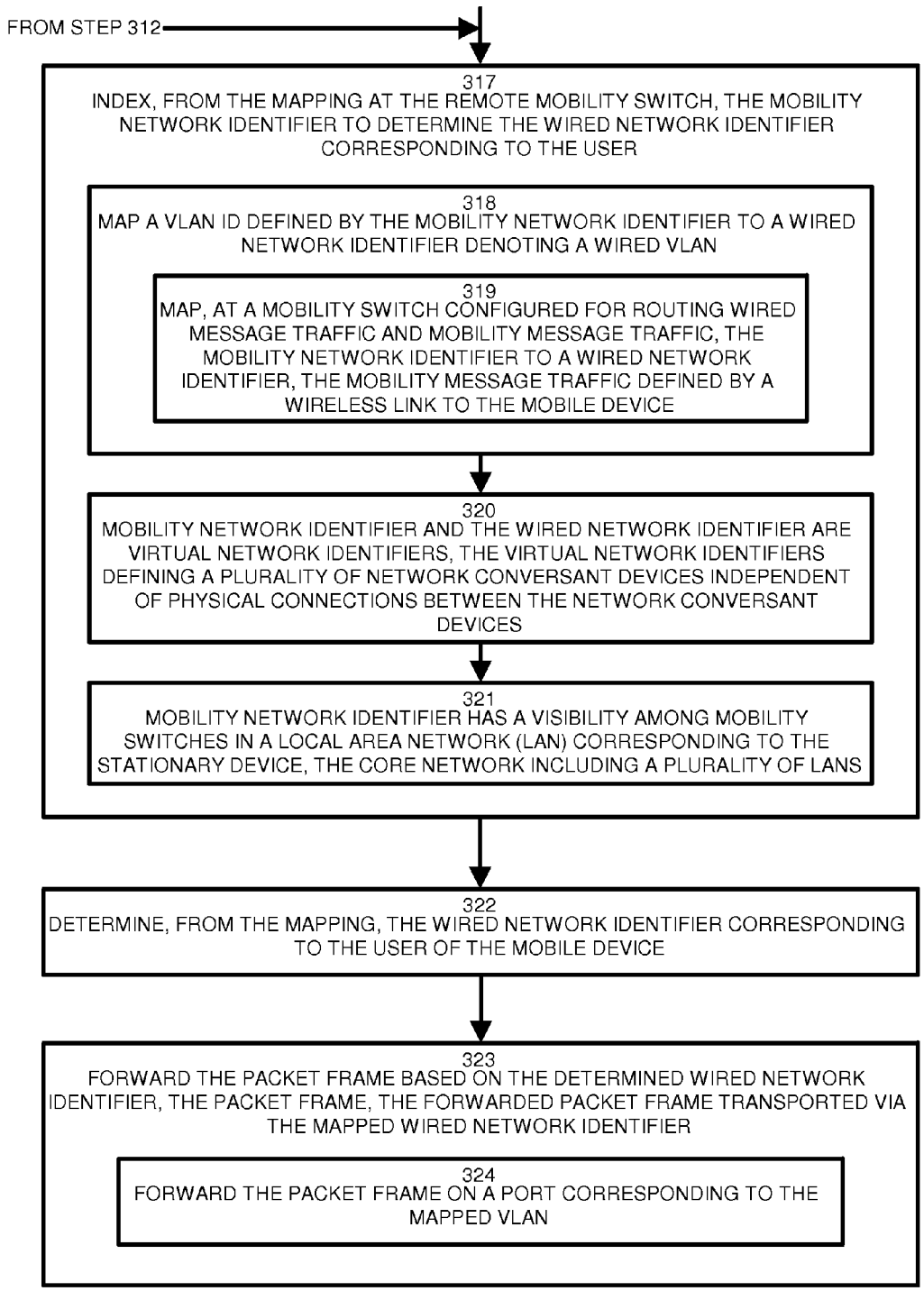

FIGS. 5-7 are a flowchart of VLAN mapping in the configuration of FIG. 4. Referring to FIGS. 1 and 3-7, at step 300, in the example configuration, the mobility controller 150 generates a mapping of mobility network identifiers 182 to users 170 such that the mobility network identifier 182 is indicative of a virtual local area network (VLAN). The VLAN has a visibility within a broadcast domain defined by L2 (layer 2) switches, is identified by a unique name 186 in the mobility domain 100 for administrative convenience. Policy definitions use the VLAN name. As part of initialization and startup, the mobility controller 150 generates or receives a 12-bit mobility VLAN tag for each mobility VLAN defined by the administrator.

This includes determining, for each user 170, the wired network identifier 184 indicative of the stationary device 111, as shown at step 301. The mobility controller 150 assigns the wired network identifier 184 to the stationary device 111 corresponding to the user 170, in which the stationary device 111 is defined by a wired connection 143 to the core network 140, and the mobility device 110 is defined by a wireless link 144 to the core network 140, as disclosed at step 302. The wired network identifier 184, in effect, provides the network identity of the user 170 because the wired network identifier 184 defines network policies and an IP address corresponding to the stationary device. The defined network policies and IP address may be attributed to the packet frames 115 mapped to the wired network identifier 184 from the mobility network identifier 182, as depicted at step 303.

In addition to the wired network identifier 184, the mobility controller 150 also assigns a mobility network identifier 182 to a mobility device 110 corresponding to a user 170, as shown at step 304. A network administrator can then enable remote service of the mobility VLAN on a mobility switch 120. The mobility switch 120 will advertise this service to peer mobility switches 120. When a mobility switch 120 is not configured to terminate traffic from access switches locally, it will tunnel the traffic to a peer mobility 120 switch that advertises a member server for the mobility VLAN (mobility network identifier 182). Enabling remote service on a mobility VLAN enables L3 mobility for users assigned to the mobility VLAN.

However, there is not yet a correlation from the mobility VLAN 182 to the stationary device (e.g. wired network VLAN 184) to identify the user 170 when operating/connecting via the mobility VLAN 182. Therefore, at step 305, the mobility controller then defines a mapping, stored as the mobility VLAN table 180, from the mobility network identifier 182 to the wired network identifier 184, in which the mapping 180 determines the wired network identifier 184 corresponding to a packet frame 115 emanating from the mobility device 110 assigned to the mobility network identifier 182. Accordingly, the mobility domain 100 stores the mapping 180 at a wireless controller (mobility controller 150), in which the wireless controller (WC) is coupled to each of the mobility switches 120 for transporting the mapping, as disclosed at step 306.

When the mobility controller 150 distributes the mobility VLAN table 180 to each of the mobility switches 120, any of the mobility switches 120 may translate the mobility VLAN identifier 182 to a local VLAN identifier 184 (tag) for switching upon receiving traffic from an access switch or a peer mobility switch. When the traffic is released locally at the mobility switch 120, it carries the local VLAN tags 184. Accordingly, the mobility controller 150 provides the generated mapping 180 across an L3(layer 3) boundary 192, in which the provided mapping 180 is for associating the mobility network identifier 182 with the wired network identifier 184 at a mobility switch 120 outside the L2 visibility of the VLAN, as depicted at step 307. In the example configuration, the core network 140 includes a plurality of mobility switches 120, such that the mobility switches are unified for transport of wired and wireless switching by maintaining the copy of the mobility VLAN table 180, as shown at step 308.

In the operation of transporting mobility traffic, a mobility switch 120 receives a packet frame 115 from a mobile device 110, such that the packet frame 115 has a mobility network identifier 182, as depicted at step 309. In the example mobility domain 100, embodying wireless transport under IEEE 802.11, the mobility switch 120 receives a packet frame 115 for forwarding, the packet frame 115 including framing according to at least one of a wired framing protocol and a wireless framing protocol, the wired framing corresponding to IEEE 802.3 and the wireless framing corresponding to 802.11, as disclosed at step 310. In a typical exchange with an access point 130, the access point receives the packet frame 115 as an 802.11 packet from the mobile device 110, and converts the packet frame 115 to an 802.3 packet for wired transport, framing the 802.3 packet as a UDP/IP frame, and tunnels the UDP/IP frame in an outer 802.3 framing across an L3 boundary via an access tunnel 174, as depicted at step 311.

The access point 130 thus maps the wireless frames 115 into a mobility VLAN tagged 802.3 frame based on a MAC address to mobility VLAN mapping (note that this is an 802.11 to 802.3 mapping at the access point 130, prior to encountering the VLAN mapping table 180). The access point 130 therefore sends, via access tunnel 174, the mobility VLAN tagged frames to a mobility switch 120. In general, the access traffic is transmitted from wired/wireless user from an attached access switch (access point 130) to a mobility switch 120. In case of wireless users, the access switch is the wireless access point 130 and it uses tunnels to transfer mobility VLAN tagged L2 frames to the mobility switch 120. Wireless users 170 are assigned to mobility VLAN(s) when they authenticate with the access network via access control 114.

A check is performed to identify a roaming user, meaning that a user 170 is accessing an access point 130 outside the L2 domain afforded by their native wired VLAN 184. If the check determines that a recipient of the packet frame is a roaming user serviced by a remote mobility switch, at step 312, then a remote mobility switch 120 is receiving a packet frame 115 from the mobile device 110, in which the remote mobility switch 120 is indicative of a roaming user, as depicted at step 313. This includes receiving a packet frame 115 from a user 170 at the L3 switch, such that the user is a roaming user 170 having a mobile device 110 in communication with a remote mobility switch 120, the remote mobility switch being in a separate broadcast domain by an intervening L3 switch 190, as depicted at step 313.

When a mobile user 170 employs an access point 130 served by a mobility switch 120 in the same L2 domain, the mobility VLAN table 160 at that mobility switch 120 has visibility of both the wired VLAN 184 and the mobility VLAN 182. However, if the user 170 roams beyond an L3 boundary, a mobility tunnel 196 is established to bridge the L3 boundary. Accordingly, at step 315, the mobility switch 120-11 establishes a mobility tunnel 196 to the remote mobility switch 120-12. This includes identifying, via the mapping 180, the mobility network identifier 182 at a mobility switch 120-12 different than the mobility switch 120-11 included in the wired connection of the stationary device 110-11 to the core network 140, as disclosed at step 316.

In both the roaming (L3 boundary) and non-roaming cases, the mobility switch 120 indexes, from the mapping 180, the mobility network identifier 182 to determine the wired network identifier 184 corresponding to the user 170, as depicted at step 317. The mobility switch 120-11 corresponding to the wired device 110-11 thus maps a VLAN ID defined by the mobility network identifier 182 to a wired network identifier 184 denoting a wired VLAN 160-10, as disclosed at step 318. In the example unified network disclosed, this includes mapping, at a mobility switch 120-11 configured for routing wired message traffic and mobility message traffic, the mobility network identifier 182 to a wired network identifier 184, in which the mobility message traffic is defined by a wireless link 144 to the mobile device 110, as clarified at step 319. Such a unified network integrates wired and wireless routing information in the mobility switches 120.

In the example VALN arrangement, he mobility network identifier 182 and the wired network identifier 184 are virtual network identifiers (VLANs), such that the virtual network identifiers define a plurality of network conversant devices independent of physical connections between the network conversant devices, as disclosed at step 320. Thus, the mobility network identifier 182 has a visibility among mobility switches 120 in a local area network (LAN) corresponding to the stationary device 110-11, in which the core network 140 includes a plurality of LANs such as that defined by mobility switches 120-12 and 120-13, as shown at step 321.

From the mapping, the mobility switch 120 determines the wired network identifier 184 corresponding to the user 170 of the mobile device 110, as depicted at step 322. As indicated above, the network identity of the user 170, such as IP address and network policies, are denoted by the VLAN corresponding to the wired network device 110-11. Therefore, users 170 employ network resources according to their assigned wired VALN ID 184, promoting consistent application of access policies and IP address. The mobility switch 120 then forwards the packet frame based on the determined wired network identifier, the packet frame 115, in which the forwarded packet frame 115 is transported via the mapped wired network identifier 184 that denotes the mobile user 170, as depicted at step 323. The forwarding decision by the mobility switch 120 thus forwards the packet frame 115 on a port corresponding to the mapped VLAN 184, as disclosed at step 324.

In network appliances (switches) having an older architecture, VLAN recognition may employ configuration tuning. Recalling that the maximum size for an Ethernet frame as specified by IEEE 802.3 is 1518 bytes, this means that if a maximum-sized Ethernet frame gets tagged, the frame size will be 1522 bytes, a number that violates the IEEE 802.3 standard. To resolve this issue, the 802.3 committee created a subgroup called 802.3 ac to extend the maximum Ethernet size to 1522 bytes. Some network devices that do not support a larger frame size will process the frame successfully but may report these anomalies In a particular configuration, if the administrator ensures that the mobility VLAN is mapped to only one wired VLAN in the domain, the disclosed mapping ensures that the wireless user gets access to same wired VLAN from all locations in the enterprise. When QoS and security policies are also associated with the wired VLAN this ensures that the network applies same policies to the user no matter where he/she connects from.

In an alternate configuration, the administrator may define a mapping of a mobility VLAN to multiple wired VLAN(s) at different mobility switches in the enterprise. In fact for certain types of mobility VLAN(s) it might be done intentionally. For example, a mobility VLAN for guest users can be mapped to different wired VLAN in different branches of the enterprise to localize the guest traffic within a branch.

Such a configuration may also be extended to wired users. By assigning wired users to mobility-VLAN they get the similar roaming capability. For example, laptops can be connected using wireless or wired medium for any location in the enterprise and the invention will ensure identical network service except for the service differences that may arise due to differences in nature of wireless/wired medium.

Some switching chip vendors may not support conversion of VLAN tags at ingress on the mobility switch. When such chips are used for mobility switches we can achieve conversion in ingress using source MAX based local-VLAN tag assignment on the ingress.

When there is no mapping configured on mobility switch between mobility-VLAN and local VLAN the traffic cannot be release locally on the mobility switch. In this case the mobility switch selects a peer mobility switch as the server of the mobility VLAN and assigns a temporary unused local VLAN tag for the mobility VLAN. This temporary local VLAN tag is used for switching decisions with the mobility switch.

Those skilled in the art should readily appreciate that the programs and methods for mapping local and mobility (wireless) virtual network identifiers as defined herein are deliverable to a user processing and rendering device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for mapping local and mobility virtual network identifiers has been particularly shown and described with references to embodiments thereof, it will be understood by those skilled in the art that various changes in form and details may be made therein without departing from the scope of the invention encompassed by the appended claims.

What is claimed is:

1. A method of transporting mobility traffic comprising:
receiving a packet frame from a mobile device, the packet frame having a mobility network identifier;
mapping, at a mobility switch configured for routing wired message traffic and mobility message traffic, the mobility network identifier to a wired network identifier, the mobility message traffic defined by a wireless link to the mobile device;
determining, from the mapping, the wired network identifier corresponding to the user of the mobile device;
forwarding, based on the determined wired network identifier, the packet frame, the forwarded packet frame transported via the mapped wired network identifier;
assigning a mobility network identifier to a mobility device corresponding to a user;
assigning a wired network identifier to a stationary device corresponding to a user, the stationary device defined by a wired connection to a core network and the mobility device defined by a wireless link to the core network; and
defining a mapping from the mobility network identifier to the wired network identifier, the mapping for determining the wired network identifier corresponding to a packet frame emanating from the mobility device assigned the mobility network identifier;
storing the mapping at a wireless controller, the wireless controller coupled to each of the mobility switches for transporting the mapping, and
indentifying, via the mapping, the mobility network identifier at a mobility switch different than the mobility switch included in the wired connection of the stationary device to the core network;

wherein the mobility network identifier has a visibility among mobility switches in a local area network (LAN) corresponding to the stationary device, the core network including a plurality of LANs, further comprising:
mapping a Media Access Control (MAC) address of the mobile device to a mobility network identifier at a wireless access point;
receiving a packet frame from the wireless access point at a remote mobility switch, the remote mobility switch indicative of roaming user; and
indexing, from the mapping at the remote mobility switch, the mobility network identifier to determine the wired network identifier corresponding to the roaming user.

2. The method of claim 1 further comprising storing the mapping at a wireless controller, the wireless controller coupled to each of the mobility switches for transporting the mapping, and
identifying, via the mapping, the mobility network identifier at a mobility switch different than the mobility switch included in the wired connection of the stationary device to the core network.

3. The method of claim 2 wherein the core network includes a plurality of mobility switches, the mobility switches unified for transport of wired and wireless switching, further comprising:
receiving a packet frame for forwarding, the packet frame including framing according to at least one of a wired framing protocol and a wireless framing protocol, the wired framing corresponding to IEEE 802.3 and the wireless framing corresponding to 802.11.

4. The method of claim 1 further comprising:
determining that a recipient of the packet frame is a roaming user serviced by a remote mobility switch; and
indexing, using the mapping, a mobility network identifier of the recipient; and
establishing a mobility tunnel to the remote mobility switch.

5. The method of claim 1 wherein the mobility network identifier and the wired network identifier are virtual network identifiers, the virtual network identifiers defining a plurality of network conversant devices independent of physical connections between the network conversant devices.

6. The method of claim 1 further comprising:
generating a mapping of mobility network identifiers to users, the mobility network identifier indicative of a virtual local area network (VLAN), the VLAN defined by L2 (layer 2) switches, the VLAN having a visibility within a broadcast domain;
determining, for each user, a wired network identifier corresponding to the mobility network identifier, the wired network identifier indicative of the stationary device; and
providing the generated mapping across an L3 (layer 3) boundary, the provided mapping for associating the mobility network identifier with the wired network identifier at a mobility switch outside the L2 visibility of the VLAN.

7. The method of claim 6 further comprising:
receiving a packet frame from a user at the L2 switch, the user being a roaming user having a mobile device in communication with a remote mobility switch, the remote mobility switch in a separate broadcast domain by an intervening L3 switch;
mapping a VLAN ID defined by the mobility network identifier to a wired network identifier denoting a wired VLAN;
enforcing network policies and identification corresponding to the wired network identifier; and
forwarding the packet frame on a port corresponding to the mapped VLAN.

8. The method of claim 7 further comprising:
receiving the packet frame as an 802.11 packet from the mobile device;
converting the packet frame to an 802.3 packet for wired transport;
framing the 802.3 packet as a UDP/IP frame; and
tunneling the UDP/IP frame in an outer 802.3 framing across an L3 boundary via a mobility tunnel.

9. A mobility switch comprising:
a wired interface to a network device, the network device corresponding to a user;
a wired network identifier corresponding to the network device,
a mobility interface to a mobile device, the mobile device corresponding to the same user as the network device;
a mobility network identifier corresponding to the mobile device;
a mapping from mobility network identifiers to wired network identifiers, the mapping configured to determine the wired network identifier corresponding to a packet frame emanating from the mobility device assigned the mobility network identifier, and further configured for forwarding, based on the determined wired network identifier, the packet frame, the forwarded packet frame transported via the mapped wired network identifier;
assigning a mobility network identifier to a mobility device corresponding to a user;
assigning a wired network identifier to a stationary device corresponding to a user, the stationary device defined by a wired connection to a core network and the mobility device defined by a wireless link to the core network; and
defining a mapping from the mobility network identifier to the wired network identifier, the mapping for determining the wired network identifier corresponding to a packet frame emanating from the mobility device assigned the mobility network identifier;
storing the mapping at a wireless controller, the wireless controller coupled to each of the mobility switches for transporting the mapping, and
indentifying, via the mapping, the mobility network identifier at a mobility switch different than the mobility switch included in the wired connection of the stationary device to the core network;
wherein the mobility network identifier has a visibility among mobility switches in a local area network (LAN) corresponding to the stationary device, the core network including a plurality of LANs, further comprising:
mapping a Media Access Control (MAC) address of the mobile device to a mobility network identifier at a wireless access point;
receiving a packet frame from the wireless access point at a remote mobility switch, the remote mobility switch indicative of roaming user; and
indexing, from the mapping at the remote mobility switch, the mobility network identifier to determine the wired network identifier corresponding to the roaming user.

10. The mobility switch of claim 9 wherein the wired network identifier and mobility network identifier are virtual network identifiers, the virtual network identifiers defining a plurality of network conversant devices independent of physical connections between the network conversant devices.

11. The mobility switch of claim 9 wherein the wireless controller is coupled to each of the mobility switches in the core network for transporting the mapping, the mapping further configured for identifying, via the mapping, the mobility network identifier at a mobility switch different than the mobility switch included in the wired connection of the stationary device to the core network.

12. The mobility switch of claim 9 wherein the core network includes a plurality of mobility switches, the mobility switches unified for transport of wired and wireless switching, further comprising:
  receiving a packet frame for forwarding, the packet frame including framing according to at least one of a wired framing protocol and a wireless framing protocol, the wired framing corresponding to IEEE 802.3 and the wireless framing corresponding to IEEE 802.11.

13. The mobility switch of claim 9 wherein the mobility switch is further configured to:
  determine that a recipient of the packet frame is a roaming user serviced by a remote mobility switch; and
  index, using the mapping, a mobility network identifier of the recipient; and
  establishing a mobility tunnel to the remote mobility switch.

14. A computer program product having computer program code encoded as a set of instructions on a non-transient computer readable storage medium that, when executed by a processor, cause the computer to perform a method for managing a split-plane wireless network, the method comprising:
  receiving a packet frame from a mobile device, the packet frame having a mobility network identifier;
  mapping, at a mobility switch configured for routing wired message traffic and mobility message traffic, the mobility network identifier to a wired network identifier, the mobility message traffic defined by a wireless link to the mobile device;
  determining, from the mapping, the wired network identifier corresponding to the user of the mobile device;
  forwarding, based on the determined wired network identifier, the packet frame, the forwarded packet frame transported via the mapped wired network identifier;
  assigning a mobility network identifier to a mobility device corresponding to a user;
  assigning a wired network identifier to a stationary device corresponding to a user, the stationary device defined by a wired connection to a core network and the mobility device defined by a wireless link to the core network; and
  defining a mapping from the mobility network identifier to the wired network identifier, the mapping for determining the wired network identifier corresponding to a packet frame emanating from the mobility device assigned the mobility network identifier;
  storing the mapping at a wireless controller, the wireless controller coupled to each of the mobility switches for transporting the mapping, and
  indentifying, via the mapping, the mobility network identifier at a mobility switch different than the mobility switch included in the wired connection of the stationary device to the core network;
  wherein the mobility network identifier has a visibility among mobility switches in a local area network (LAN) corresponding to the stationary device, the core network including a plurality of LANs, further comprising:
  mapping a Media Access Control (MAC) address of the mobile device to a mobility network identifier at a wireless access point;
  receiving a packet frame from the wireless access point at a remote mobility switch, the remote mobility switch indicative of roaming user; and
  indexing, from the mapping at the remote mobility switch, the mobility network identifier to determine the wired network identifier corresponding to the roaming user.

* * * * *